(12) United States Patent
Pfeifer et al.

(10) Patent No.: US 6,988,444 B1
(45) Date of Patent: Jan. 24, 2006

(54) COMBINATION GRINDER AND BREWER

(75) Inventors: Thomas J. Pfeifer, Louisville, KY (US); Donald E. Smith, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 317 days.

(21) Appl. No.: 10/429,414

(22) Filed: May 5, 2003

Related U.S. Application Data

(60) Provisional application No. 60/380,798, filed on May 15, 2002.

(51) Int. Cl.
*A47J 31/40* (2006.01)

(52) U.S. Cl. .......................................... 99/286; 99/290

(58) Field of Classification Search ................. 99/286, 99/290; 241/55, 81, 259.1, 261.2
See application file for complete search history.

(56) References Cited

U.S. PATENT DOCUMENTS

| | | | | |
|---|---|---|---|---|
| 4,895,308 A | * | 1/1990 | Tanaka | 241/65 |
| 5,845,561 A | * | 12/1998 | Chigira et al. | 99/286 |
| 6,095,032 A | * | 8/2000 | Barnett et al. | 99/286 |

FOREIGN PATENT DOCUMENTS

| | | | | |
|---|---|---|---|---|
| GB | 2197178 | * | 12/1987 | 99/286 |

* cited by examiner

*Primary Examiner*—Reginald L. Alexander
(74) *Attorney, Agent, or Firm*—Stites & Harbison, PLLC; David W. Nagle, Jr.

(57) ABSTRACT

A combination grinder and brewer for grinding of coffee beans and delivering ground coffee to a brewing chamber for the brewing of a coffee beverage includes a fan for creating a positive pressure air blanket at the interface between the delivery system and the brewing chamber so as to minimize movement of moistened air from the brewing chamber into the delivery system.

17 Claims, 2 Drawing Sheets

COMBINATION GRINDER AND BREWER

CROSS-REFERENCE TO RELATED APPLICATIONS

The present application claims priority to U.S. Provisional Application Ser. No. 60/380,798 filed May 15, 2002, the entire disclosure of which is incorporated herein by reference.

BACKGROUND OF THE INVENTION

The present invention relates to a combination grinder and brewer for the grinding of coffee beans and the delivery of the ground coffee to a brewing chamber (also commonly referred to as a "brew basket") for the brewing of a coffee beverage. More specifically, the present invention relates to a combination grinder and brewer in which a positive pressure air blanket is used to minimize the exposure of ground coffee to the moistened air produced in the brewing chamber as the ground coffee is delivered from the grinder and into the brewing chamber.

Apparatus for grinding coffee beans into ground coffee have found significant consumer acceptance, presumably due to the perceived freshness of the coffee produced with recently ground coffee. Many commercial establishments use combinations of coffee grinders and brewers or a single unit having the combined features to produce coffee of the freshness now being demanded by the consumer. Grocery chains have long recognized that many discerning coffee drinkers prefer to grind their own coffee at the store and thus have provided coffee beans and the necessary apparatus for the self grinding of the beans into ground coffee. The roasted coffee bean, however, produces along with the particles of ground coffee a very fine powder, primarily bean husk, called chaff fines that tend to float and separate from the main stream of ground coffee that emerges from the coffee grinder. During grinding and the associated creation of electrostatic energy, some of the chaff fines adhere to the surfaces of the grinder and other internal components of the combination grinder and brewer.

A combination grinder and brewer typically has the capability of grinding coffee beans as a coffee grinder discussed above, and additionally provides for the delivery of ground coffee to a brewing chamber. For example, U.S. Pat. No. 5,542,342 issued to McNeill discloses a combination grinder and brewer with a basket sensing mechanism to avoid the problem of ground coffee being delivered accidentally when no basket is present and includes a discussion of prior art constructions of combination grinders and brewers. However, in such constructions, since the coffee brewer is in close vicinity to the grinder, a gummy substance is often produced by the moistened air from brewing process coming into contact with the chaff fines. This gummy substance must be cleaned from the combination grinder and brewer frequently to provide for a clean appearance and proper functioning.

A number of proposed constructions are described in the prior art that claim to reduce the frequency of cleaning necessitated by the generation of chaff fines and the gummy substance resulting from the exposure of these chaff fines to moistened air. As examples of such devices, reference is first made to U.S. Pat. Nos. 4,833,642 and 5,042,731, each of which is assigned to the Bunn-O-Matic Corporation of Springfield, Ill. and describes a coffee grinder with a discharge chute of the type commonly found in grocery stores. The described grinders are provided with a chaff fine suppressor in the form of lever-like member. The chaff fine suppressor is attached to the discharge chute immediately adjacent the opening into the grinding mechanism. The chaff fine suppressor serves to dissipate electrostatic energy and prevent the chaff fines from separating from the main stream of ground coffee.

For an example of a moisture reduction device, reference is made to U.S. Pat. No. 5,444,434, which is assigned to Grindmaster Crathco Systems, the assignee of the present application. Specifically, a valve or "shutter" selectively closes the opening to the grinding mechanism during the brewing operation. This prevents the moistened air from the brewing process from travelling through the chute and into the grinding mechanism where ground coffee and chaff fines can absorb the moisture, resulting in the above-described "gummy" substance. While such a valve or shutter may lessen the problems associated with chaff fines, such valves or shutters may often "stick," remaining open or closed due to the creation of a gummy substance at the juncture of the valve and chute. This "sticking" problem may cause jamming of ground coffee at the end of the end of the dispensing chute, which may ultimately result in failed solenoid coils, stalled grinder motors, or similar equipment failures.

In any event, despite various proposed constructions in the prior art, there remains a problem of ground coffee and chaff fines coming into contact with the moisture of the brewing chamber and adhering to the components and surfaces of the combination grinder and brewer. Thus, present applicants recognized that isolating the ground coffee from the moistened air associated with the brewing chamber could significantly reduce accumulation of ground coffee and chaff fines, and thus the creation of a gummy substance on the surfaces of the combination grinder and brewer.

It is an object of the present invention to provide a combination grinder and brewer with a construction that reduces the accumulation of ground coffee and chaff fines on its components and surfaces.

It is another object of the present invention to provide a combination grinder and brewer that effectively reduces the introduction of moisture from the brewing chamber into the ground coffee delivery system and grinder.

It is still another object of the present invention to provide a combination grinder and brewer that provides for improved dispersal of aroma resulting from the brewing process.

These and other objects and advantages of the present invention will become apparent upon a reading of the following description.

SUMMARY OF THE PRESENT INVENTION

The present invention is a combination grinder and brewer for the grinding of coffee beans and delivery of the ground coffee to a brewing chamber for the brewing of a coffee beverage, in which a positive pressure air blanket is used to minimize the exposure of ground coffee and chaff fines to the moistened air produced in the brewing chamber as the ground coffee is delivered from the grinder and into the brewing chamber.

A preferred combination grinder and brewer made in accordance with the present invention generally includes a storage hopper for the coffee beans and a grinder for grinding the coffee beans into ground coffee. The preferred combination grinder and brewer also includes a delivery system for delivering the ground coffee to a brewing chamber, preferably comprised of a helical screw-type auger housed within a conduit, with the spiral channels of the auger appropriately spaced to allow for the delivery of ground coffee to the brewing chamber as the auger rotates. Finally, the preferred combination grinder and brewer also includes a hot water distributing system, which generally comprises a water storage tank and a water distribution head positioned above the brewing chamber that is in liquid communication with the storage tank.

To achieve the desired isolation of the ground coffee from the moistened air produced in the brewing chamber of the combination grinder and brewer, it is preferred that an air blanket be created at the interface between the auger that delivers the ground coffee to the brewing chamber and the brewing chamber itself. The preferred air blanket has the effect of preventing or significantly minimizing the movement of moistened air from the brewing chamber into the areas adjacent the auger and grinder. The preferred air blanket is created by ambient air that is drawn through an inlet and directed by a fan toward the dispensing end of the auger. By constructing a combination grinder and brewer in this manner, a shutter-less interface between the auger and the brewing chamber is achieved. Furthermore, creation of the desired air blanket has an additional result of dispersing aroma generated from the grinding and brewing processes, such coffee aroma being a powerful olfactory stimulant that greatly assists in the marketing of brewed coffee to potential consumers.

DETAILED DESCRIPTION OF THE INVENTION

The present invention is a combination grinder and brewer for the grinding of coffee beans and delivery of the ground coffee to a brewing chamber for the brewing of a coffee beverage. More specifically, the present invention is a combination grinder and brewer in which a positive pressure air blanket is used to minimize the exposure of ground coffee and chaff fines to the moistened air produced in the brewing chamber as the ground coffee is delivered from the grinder and into the brewing chamber.

Figure 1:
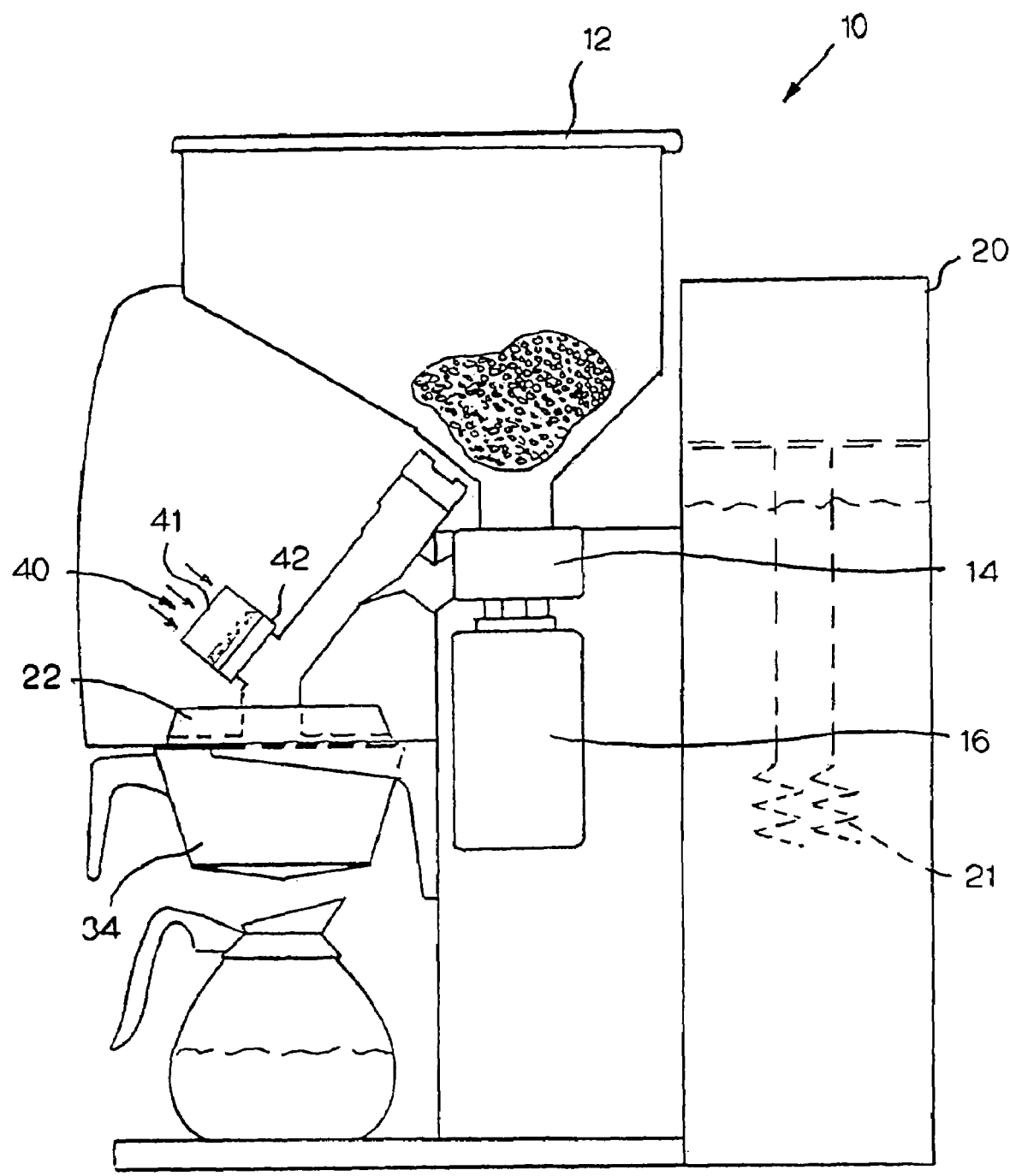
FIG. 1 is a side view of a preferred combination grinder and brewer made in accordance with present invention.
Figure 2:
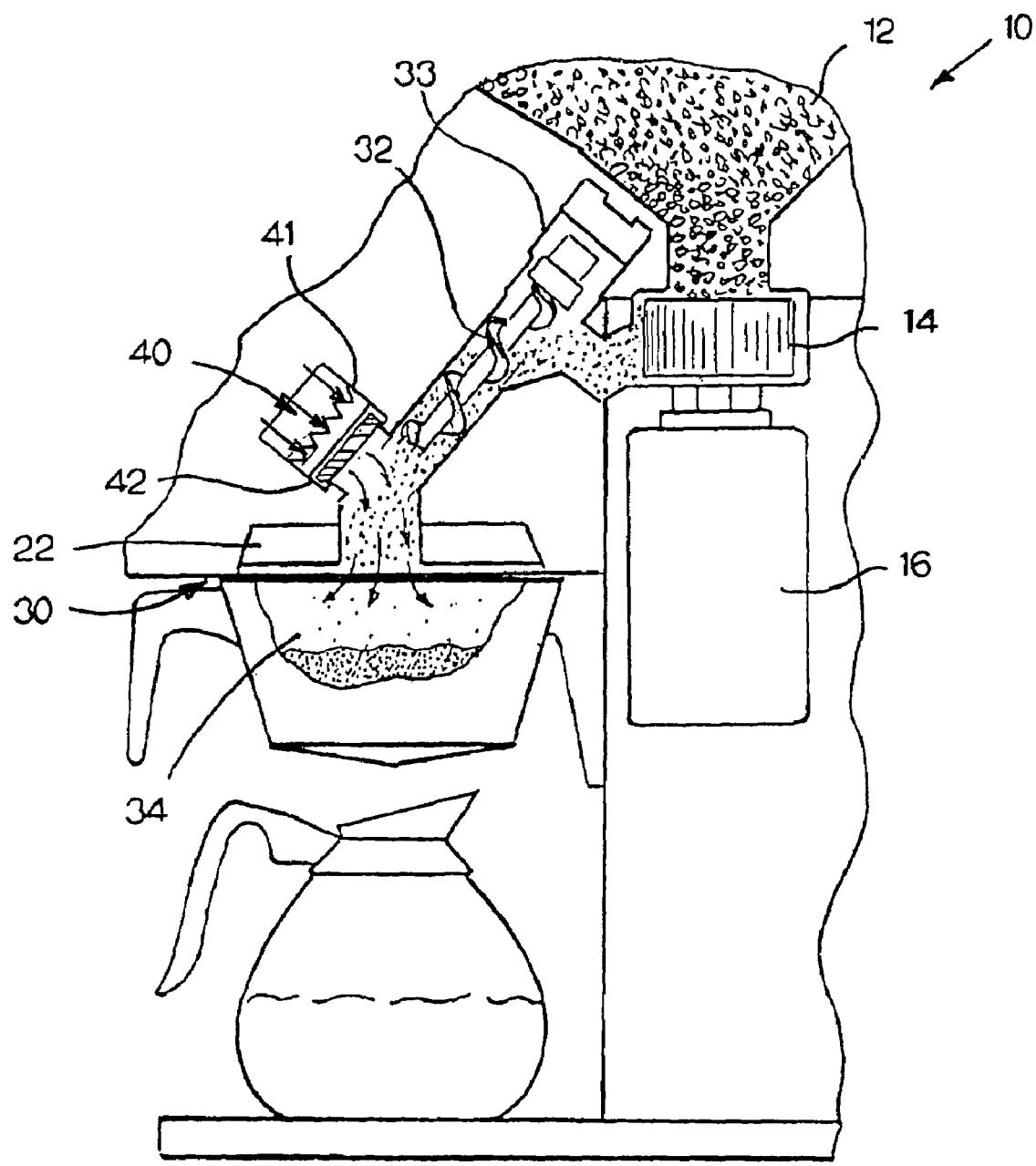
FIG. 2 is an enlarged side sectional view of the preferred combination grinder and brewer of FIG. 1.

As shown in FIGS. 1 and 2, a preferred combination grinder and brewer 10 made in accordance with the present invention generally includes a storage hopper 12 for the coffee beans and a grinder 14 for grinding the coffee beans into ground coffee. Specifically, in this preferred embodiment, the coffee beans are gravity fed through a funnel into the grinder 14, which is driven by a grinder motor 16. Such grinders are well known in the prior art, and thus a detailed discussion of the operation of the grinder 14 is not necessary for purposes of describing the present invention.

The preferred combination grinder and brewer 10 also includes a delivery system for delivering the ground coffee to a brewing chamber 34. In this preferred embodiment, and as best illustrated in FIG. 2, the delivery system generally comprises a helical screw-type auger 32 housed within a conduit 33, with the spiral channels of the auger 32 appropriately spaced to allow for the delivery of ground coffee as the auger 32 rotates.

Finally, the preferred combination grinder and brewer 10 also includes a hot water distributing system. In this preferred embodiment, and as best illustrated in FIG. 1, the hot water distributing system generally comprises a water storage tank 20 that includes heating elements 21 that are immersed in the water, a water distribution head 22 positioned above the brewing chamber 34 that is in liquid communication with the storage tank 20, and a control system (not shown) for regulating the flow of water from the storage tank 20 to the brewing chamber 34. Many such hot water distributing systems are well known in the prior art, and thus a detailed discussion of the hot water distributing system is not necessary for purposes of describing the present invention.

As mentioned above, in a combination grinder and brewer, there is often the problem of ground coffee and chaff fines coming into contact with the moisture of the brewing chamber and adhering to the components and surfaces of the combination grinder and brewer. Thus, it would be desirable to isolate the ground coffee and chaff fines from the moistened air associated with the brewing chamber in an effort to reduce accumulation of ground coffee and chaff fines, and thus the creation of a gummy substance on the components and surfaces of the combination grinder and brewer.

To achieve the desired isolation of the ground coffee from the moistened air produced in the brewing chamber 34 of the combination grinder and brewer 10, it is preferred that an air blanket be created at the interface between the delivery system that delivers the ground coffee to the brewing chamber 34 and the brewing chamber 34 itself. Such an air blanket has the effect of preventing or significantly minimizing the movement of moistened air from the brewing chamber 34 into the areas adjacent the auger 32 and grinder 14. The preferred air blanket is created by ambient air that is drawn through an inlet 40 and directed by a fan 42 toward a distal end of delivery system, i.e., the dispensing end of the auger 32. Although one preferred construction is illustrated in FIGS. 1 and 2, the inlet 40 and fan 42 could certainly be positioned at different locations within the combination grinder and brewer 10 without departing from the spirit and scope of the present invention, provided that the air blanket is created at the interface between the auger 32 (or equivalent component of the delivery system) that delivers the ground coffee to the brewing chamber 34 and the brewing chamber 34 itself. By constructing a combination grinder and brewer 10 in this manner, a shutter-less interface between the delivery system and the brewing chamber 34 is achieved. Thus, unlike prior art valves and shutters, there is no back pressure on the grinder motor 16 or increased loading. Nevertheless, it is contemplated that such an air blanket could be used in conjunction with a prior art valve or shutter without departing from the spirit and scope of the present invention.

As a further refinement, the air drawn through the inlet 40 may be heated above room temperature by a heater 41 positioned at or near the inlet 40. Heated air is preferred to minimize the amount of airborne moisture introduced into the combination grinder and brewer.

Furthermore, creation of the desired air blanket has an additional result of dispersing aroma generated from the grinding and brewing processes. Specifically, such aroma dispersal occurs at gaps at the upper end of the brewing chamber 34, as generally indicated by reference numeral 30 in FIG. 2. Of course, aroma dispersal could be also be facilitated through the use of vents or other fluid conduits. In any event, coffee aroma is a powerful olfactory stimulant and greatly assists in the marketing of brewed coffee to potential consumers.

Finally, as mentioned above, the preferred auger 32 that delivers the ground coffee to the brewing chamber 34 is a helical screw-type auger 32 housed within a conduit 33, with the spiral channels of the auger 32 appropriately spaced to allow for the delivery of ground coffee as the auger 32 rotates. As a further refinement, it is preferred that the inner diameter of this conduit 33 be slightly larger than the outer diameter of the auger 32 so that there is minimal clearance between the auger 32 and the conduit 33. The ground coffee is therefore delivered to the brewing chamber 34 in discrete confined spaces in an effort to reduce the electrostatic charges that often result from the grinding process and further minimize the accumulation of chaff fines on the components and/or surfaces of the combination grinder and brewer.

It will be obvious to those skilled in the art that further modifications may be made to the embodiments described herein without departing from the spirit and scope of the present invention.

What is claimed is:

1. A combination grinder and brewer, comprising:
    a storage hopper for coffee beans;
    a grinder in communication with said storage hopper for grinding coffee beans into ground coffee;
    a delivery system for delivering ground coffee from said grinder to a brewing chamber;
    a hot water distributing system for distributing hot water to said brewing chamber; and
    a means for directing air generally downward and toward the brewing chamber to create an air blanket at an interface between said delivery system and said brewing chamber so as to minimize movement of moistened air from said brewing chamber into said delivery system.

2. The combination grinder and brewer as recited in claim 1, wherein said delivery system generally comprises an auger housed within a conduit.

3. The combination grinder and brewer as recited in claim 1, wherein the means for directing air and creating said air blanket is a fan positioned near the interface between said delivery system and said brewing chamber.

4. The combination grinder and brewer as recited in claim 2, wherein the means for directing air and creating said air blanket is a fan positioned near the interface between said delivery system and said brewing chamber.

5. The combination grinder and brewer as recited in claim 3, and further comprising a heater positioned near said fan for heating air drawn by said fan for creating said air blanket.

6. The combination grinder and brewer as recited in claim 4, and further comprising a heater positioned near said fan for heating air drawn by said fan for creating said air blanket.

7. The combination grinder and brewer as recited in claim 2, wherein said conduit has an inner diameter slightly larger than an outer diameter of said auger so that there is a minimal clearance defined between said auger and said conduit, such that ground coffee is delivered to said brewing chamber in discrete confined spaces to reduce electrostatic charges.

8. In an apparatus including a grinder for grinding coffee beans and a delivery system for delivering ground coffee to a brewing chamber, the improvement comprising:
    a fan positioned near a distal end of said delivery system for directing air generally downward and toward the brewing chamber to create an air blanket at an interface between said delivery system and said brewing chamber, thus minimizing movement of moistened air from said brewing chamber into said delivery system.

9. The apparatus as recited in claim 8, wherein said delivery system generally comprises an auger housed within a conduit.

10. The apparatus as recited in claim 9, wherein said conduit has an inner diameter slightly larger than an outer diameter of said auger so that there is a minimal clearance defined between said auger and said conduit, such that ground coffee is delivered to said brewing chamber in discrete confined spaces to reduce electrostatic charges.

11. The apparatus as recited in claim 8, and further comprising a heater positioned near said fan for heating air drawn by said fan for creating said air blanket.

12. A combination grinder and brewer, comprising:
    a storage hopper for coffee beans;
    a grinder in communication with said storage hopper for grinding coffee beans into ground coffee;
    a delivery system for delivering ground coffee from said grinder to a brewing chamber;
    a hot water distributing system for distributing hot water to said brewing chamber;
    a fan positioned for creating an air blanket at an interface between said delivery system and said brewing chamber so as to minimize movement of moistened air from said brewing chamber into said delivery system; and
    a heater positioned near said fan for heating air drawn by said fan for creating said air blanket.

13. The combination grinder and brewer as recited in claim 12, wherein said delivery system generally comprises an auger housed within a conduit.

14. The combination grinder and brewer as recited in claim 12, wherein said conduit has an inner diameter slightly larger than an outer diameter of said auger so that there is a minimal clearance defined between said auger and said conduit, such that ground coffee is delivered to said brewing chamber in discrete confined spaces to reduce electrostatic charges.

15. In an apparatus including a grinder for grinding coffee beans and a delivery system for delivering ground coffee to a brewing chamber, the improvement comprising:
    a fan positioned near a distal end of said delivery system for creating an air blanket at an interface between said delivery system and said brewing chamber, thus minimizing movement of moistened air from said brewing chamber into said delivery system; and
    a heater positioned near said fan for heating air drawn by said fan for creating said air blanket.

16. The apparatus as recited in claim 15, wherein said delivery system generally comprises an auger housed within a conduit.

17. The apparatus as recited in claim 16, wherein said conduit has an inner diameter slightly larger than an outer diameter of said auger so that there is a minimal clearance defined between said auger and said conduit, such that ground coffee is delivered to said brewing chamber in discrete confined spaces to reduce electrostatic charges.

* * * * *